(12) United States Patent
Dewhurst et al.

(10) Patent No.: US 11,470,245 B2
(45) Date of Patent: Oct. 11, 2022

(54) SYSTEM AND METHOD FOR FAULT DETECTION AND CORRECTION

(71) Applicant: Apical Limited, Cambridge (GB)

(72) Inventors: Andrew Dewhurst, Cambridge (GB); David Hanwell, Cambridge (GB)

(73) Assignee: Arm Limited, Cambridge (GB)

( * ) Notice: Subject to any disclaimer, the term of this patent is extended or adjusted under 35 U.S.C. 154(b) by 391 days.

(21) Appl. No.: 16/822,976

(22) Filed: Mar. 18, 2020

(65) Prior Publication Data
US 2020/0351438 A1    Nov. 5, 2020

(30) Foreign Application Priority Data

May 1, 2019    (GB) .................................... 1906115

(51) Int. Cl.
| | |
|---|---|
| *H04N 5/232* | (2006.01) |
| *G06N 20/00* | (2019.01) |
| *G06F 17/18* | (2006.01) |
| *G05D 1/02* | (2020.01) |
| *B60R 1/00* | (2022.01) |
| *B60R 1/12* | (2006.01) |

(52) U.S. Cl.
CPC ........... *H04N 5/23222* (2013.01); *B60R 1/00* (2013.01); *G05D 1/0246* (2013.01); *G06F 17/18* (2013.01); *G06N 20/00* (2019.01); *B60R 2001/1253* (2013.01); *G05D 2201/0213* (2013.01)

(58) Field of Classification Search
CPC ...... G06F 17/10; G01N 27/02; G01M 15/042; F16N 2250/00; F01M 11/10; F05D 2260/80
See application file for complete search history.

(56) References Cited

U.S. PATENT DOCUMENTS

| | | | |
|---|---|---|---|
| 6,948,092 B2 | 9/2005 | Kondo et al. | |
| 2002/0113885 A1 | 8/2002 | Inoue et al. | |
| 2004/0176901 A1* | 9/2004 | Uluyol | ...................... F02C 9/00 |
| | | | 477/30 |

(Continued)

FOREIGN PATENT DOCUMENTS

| | | |
|---|---|---|
| CN | 202142188 U | 2/2012 |
| EP | 0917358 A1 | 5/1999 |

OTHER PUBLICATIONS

European Extended Search report dated Aug. 27, 2020 for EP Application No. 20164461.4.
(Continued)

*Primary Examiner* — Joon Kwon
(74) *Attorney, Agent, or Firm* — EIP US LLP

(57) ABSTRACT

A method for detecting and correcting transient faults, the method the steps of comprising obtaining (110) image data from a camera system, and processing (120) image data using a first image signal processor and a second image signal processor, to produce first and second output data. At least one statistical model is generated (130) based on at least the first and second output data and used to identify (140) whether a fault is present in the first output data. A correction value for the portion of image data is generated (150), wherein the correction value is an expected value based on the statistical models, and used to generate (160) updated output data. The updated output data is then outputted (170) to an output device.

14 Claims, 3 Drawing Sheets

(56) References Cited

U.S. PATENT DOCUMENTS

| | | | |
|---|---|---|---|
| 2008/0298717 A1 | 12/2008 | Lee et al. | |
| 2008/0316329 A1 | 12/2008 | Kim et al. | |
| 2017/0272740 A1 | 9/2017 | Clark, II et al. | |
| 2019/0294106 A1* | 9/2019 | Cheng | G03H 1/0005 |
| 2020/0126210 A1* | 4/2020 | Li | G06T 7/0004 |
| 2021/0141697 A1* | 5/2021 | Chin | G06F 13/4282 |

OTHER PUBLICATIONS

Du et al., "An extended model to support detailed GPGPU reliability analysis", 2019 14th International Conference on Design & Technology of Integrated Systems in Nanoscale Era (DTIS), IEEE, Apr. 16, 2019 (Apr. 16, 2019), pp. 1-6, XP033560881, DOI: 10.1109/DTIS.2019.8735047.

United Kingdom Search Report dated Oct. 1, 2019 for GB Application No. 1906115.9.

\* cited by examiner

SYSTEM AND METHOD FOR FAULT DETECTION AND CORRECTION

CROSS-REFERENCE TO RELATED APPLICATIONS

This application claims the benefit under 35 U.S.C. § 119(a) and 37 CFR § 1.55 to United Kingdom patent application no. GB1906115.9, filed on May 1, 2019, the entire content of which is incorporated herein by reference.

BACKGROUND OF THE INVENTION

Field of the Invention

The present disclosure relates to the detection and correction of faults in data captured by one or more sensors of a safety critical system, more particularly faults in image data captured by a camera.

Description of the Related Technology

Safety critical systems, such as in autonomous vehicles, often capture data about the environment, for example, images of the environment, in order to make decisions about what actions to take. If the system detects a fault in one or more portions of the data, such as in a pixel of image data, then the data is often discarded as it is classed as unreliable. Where systems are required to analyse the movement of objects over time, and therefore track the object's movement in multiple portions of the data, this can result in further faults being introduced due to being unable to analyse missing portions.

SUMMARY

According to a first aspect of the present disclosure, there is provided a method for detecting and correcting transient faults, the method the steps of comprising obtaining image data from a camera system; processing image data using a first image signal processor and a second image signal processor, to produce first and second output data; generating at least one statistical model based on at least the first and second output data; identifying whether a fault is present in the first output data based on the statistical models; generating a correction value for the portion of image data wherein the correction value is an expected value based on the statistical models; generating updated output data using the correction value, and outputting the updated output data to an output device.

According to a second aspect of the present disclosure, there is provided a safety critical system comprising a camera system for obtaining image data relating to a system environment; at least two image signal processors each for processing the image data received from the camera system and generating a first output and a second output; a fault detection and correction module, for detecting one or more faults in the first output, and generating updated output data wherein the updated output data comprises a corrected fault, the corrected fault generated using at least statistical model based on the first output and second output; and an output device for receiving the updated output data from the fault detection and correction module.

According to a third aspect of the present disclosure, there is provided a non-transitory computer readable storage medium comprising a set of computer-readable instructions stored thereon which, when executed by at least one processor cause the processor to detect and correct errors in a safety critical system, the instructions comprising obtaining image data from a camera system; processing image data using a first image signal processor and a second image signal processor, to produce first and second output data; generating at least one statistical model based on at least the first and second output data; determining whether a fault is present in the first output data based on the statistical models; generating a correction value for the portion of image data wherein the correction value is an expected value based on the statistical models; generating updated output data using the correction value; and outputting the updated output data to an output device.

According to a fourth aspect of the present disclosure, there is provided an autonomous vehicle comprising at least one camera system; and a processor arranged to undertake the method for detecting and correcting transient faults.

BRIEF DESCRIPTION OF THE DRAWINGS

Further features and advantages of the embodiments will become apparent from the following description of preferred embodiments of the invention, given by way of example only, which is made with reference to the accompanying drawings in which like reference numerals are used to denote like features.

DETAILED DESCRIPTION OF CERTAIN INVENTIVE EMBODIMENTS

Figure 1:
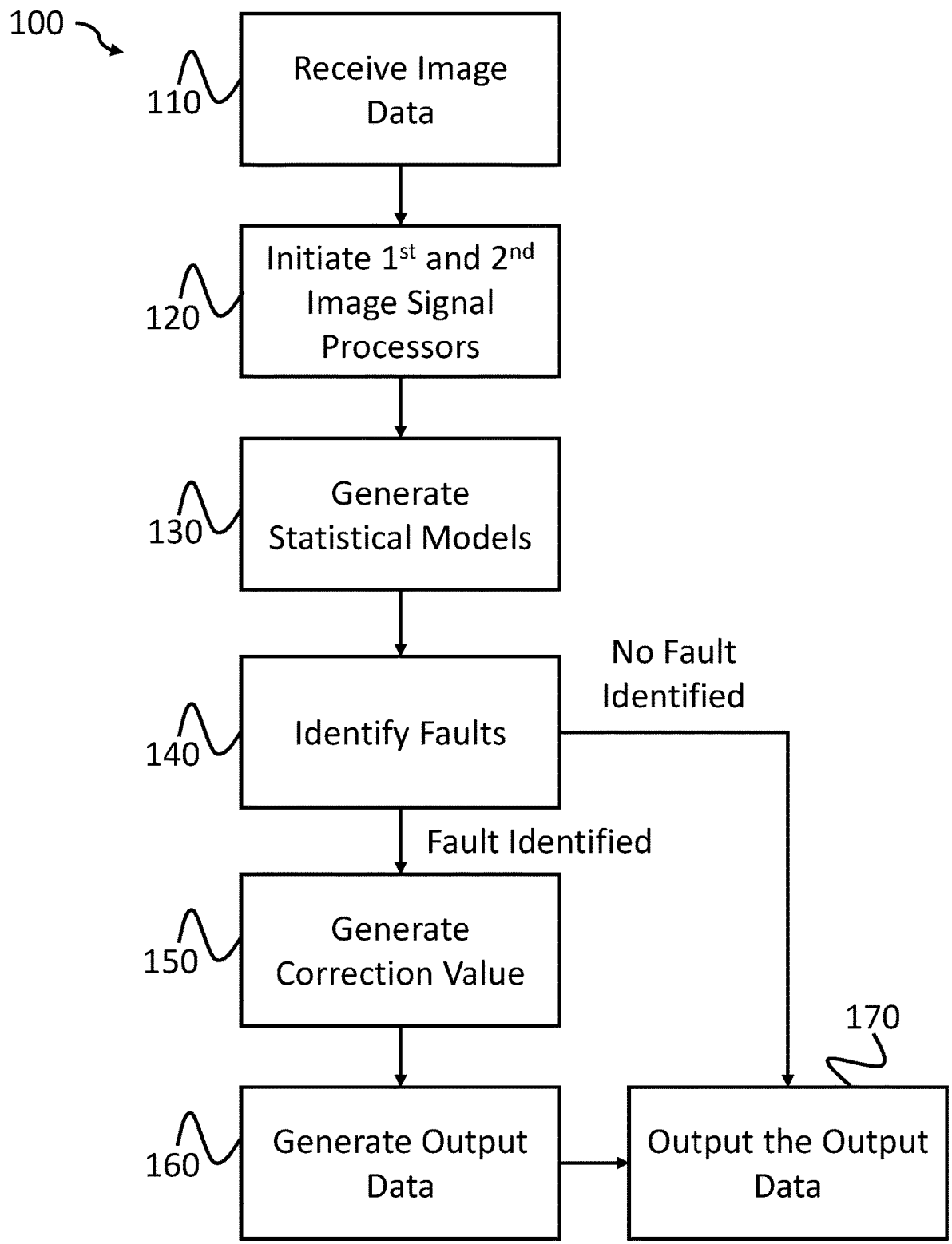
FIG. 1 is a flow diagram showing a method according to examples.

Details of systems and methods according to examples will become apparent from the following description with reference to the Figures. In this description, for the purpose of explanation, numerous specific details of certain examples are set forth. Reference in the specification to 'an example' or similar language means that a feature, structure or characteristic described in connection with that example is included in at least that one example but not necessarily in other examples. It should be further noted that certain examples are described schematically with certain features omitted and/or necessarily simplified for the ease of explanation and understanding of the concepts underlying the examples.

In safety critical systems, transient faults may affect data produced and stored by components of the system. Such transient faults may be caused by defects in the design or construction of the system. Alternatively, in storage devices and processors, chip-level transient faults may occur when particles hit the silicon die of the component. The chip-level transient faults result in changes to the data (the electrons in a storage circuit, for example) and not changes to the physical chip itself. Particles which may cause an interaction such as this, include but are not limited to, alpha particles from package decay, cosmic rays creating energetic neutrons and protons, and thermal neutrons—neutrons that have lost kinetic energy until they are in thermal equilibrium with their surroundings. For example, if a particle with certain properties hits a flip-flop in a component of the system, it can cause the flip-flop to change state to a different value. Whilst the interaction is so small that it does not damage the physical structure of the silicon die, it can corrupt data stored thereon, and as such affect, processes being undertaken by a processor. Similarly, faults may occur if the particles interact with a data bus, causing noise, which can be interpreted as a data bit thereby causing further faults.

Transient faults are frequent in the real world, and transient faults such as those caused by particle strikes in memory, and are generally unavoidable, yet may have implications on the analysis of data received by the system. Therefore, in the real world, safety-critical systems need to be able to detect and potentially correct such transient faults. One example for detecting these faults is to operate a redundant system in lockstep. Some systems may be implemented as systems on chips, and therefore multiple components of the system may be susceptible to transient faults. Similarly, in image signal processors, and other processors such as graphical processing units, a large portion of the chip is dedicated to the algorithmic processing of pixel data. It is necessary to ensure the detection and correction of these transient faults, as they may result in more significant faults in the data, throughout the processing pipeline.

For image processing applications, the determination of a fault, and its significance is especially challenging. For instance, in a camera system of an autonomous vehicle, faults must not only be detected, but the best method of responding to the fault must also be determined. The fault may be detected by comparing the output with an output of a redundant system, and if the comparison indicates a fault, the system may discard the data comprising the fault, as it will be unknown as to what the correct values in the data are meant to be.

However, data having a single bit fault, or even multiple faults, such as faults in a few pixels of the image may still be useful to an autonomous vehicle system. These systems are generally capable of making use of inputs with minor defects. For example, a computer vision system may already have image correction algorithms and other methods available for correcting non-optimal input image data with some tolerance. Most computer vision algorithms are capable of analysing non-optimal image data for example, due to lens effects, and other obstructions such as dirt on the lens. Some computer vision algorithms are also capable of detecting partially obscured objects and/or people.

As mentioned above, safety-critical systems often discard data when it is determined that there is a fault, for example by comparing the data with data from a redundant system in lockstep. This is not ideal, many systems, especially those used in autonomous vehicles, require a continuous stream of data on which to make decisions, for example detecting and tracking obstructions. If a fault is detected, and the system is reset and/or the corrupted data is discarded, the continuity of the data is disrupted, and as such can affect the ability of the vision system to track moving objects. Furthermore, where the system is reset, this will cause a period in which the system has no information or history of the movement of objects, as such the system will lose the ability to track moving objects through a frame.

FIG. 1 is a flow diagram showing a method according to examples. At item 110, data is obtained from one or more sensors, for example, image data may be obtained from a camera. The one or more sensors may be associated with a device, such as an autonomous vehicle. The sensors are capable of obtaining information regarding the environment from a number of different wavelengths. For example, an image sensor may typically comprise an array of sensor pixels which may be any suitable photosensors for capturing images. A typical sensor pixel includes a photosensitive element such as a photodiode that can convert incident light into electronic signals or data. The sensor pixel may, for example, be a charge-coupled device (CCD) or a complementary metal-oxide semiconductor (CMOS). An exposure typically sets the time period over which the light is captured by each sensor pixel of the image sensor and/or the gain applied by an amplifier to the electrical signal generated by each sensor pixel. The sensitivity of an image sensor to incident light is therefore generally determined by the exposure. The image sensor may be arranged to capture the image data using a single exposure. For example, all the sensor pixels of the image sensor may capture light during the same period or during a time period of the same length as each other. However, in other examples, an image sensor for use with examples described herein may be a multi-exposure image sensor, which is arranged to capture the image data using sensor pixels with at least two different exposures.

Therefore, the image data may represent at least one characteristic of the light captured by each sensor pixel, which may be proportional to the number of photons captured by each sensor pixel. The intensity may represent a luminance of the captured light, which is, for example, a measure of the intensity of light per unit area rather than an absolute intensity. In other examples, the image data may be representative of a brightness of captured light, which may be considered to correspond to a perception of a luminance, which may or may not be proportional to the luminance. In general, the image data may represent any photometric quality or characteristics that may be used to represent the visual appearance of the image represented by the image data. The image data may be in any suitable format, such as raw image format. The image data may also be streamed from the image sensor with or without being saved to a frame buffer, without saving the raw image data to a file. In such cases, image data obtained after processing of the raw image data may, however, be saved to a file.

In other examples, the sensor may be an infrared camera, or a camera capable of obtaining environmental information in the visible light spectrum. In some examples, instead of a camera, the device may comprise other sensors for receiving radio waves emitted from an output means associated with the device, such as sonar or ultrasonic radiation.

Once the data has been obtained, the method progresses to item 120, where the data is processed by two or more processors, arranged to operate in lockstep. There is a primary processor and one or more redundant, back-up processors depending on the desired level of redundancy. The output of the processors may be used to determine what actions an autonomous vehicle should take. The processors need not operate on to the entirety of the data captured by the sensors, and may only operate on a portion of the data. For example, the processing may operate on a portion of the image where the system determines it is necessary to track the movement of objects, or where it is determined that only a part of the data is needed to make a decision.

Statistical models are then generated at item 130. The statistical models are capable of identifying faults and generated expected correction values based on the received data and the outputs of the primary and redundant processors. Furthermore, the statistical models may also be based on the statistical likelihood of a real-world image as a reference against from which the actual correction value may be calculated and can then be used to replace the faulty data with data matching a statistical model. The statistical model may be computed by comparing the variance of local pixel values and the expected variance given a particular noise model and the current sensor gain. For example, a flipped most significant bit is more likely to result in a high variance. The noise model may be modelled by a combination of Poisson and Normal distributions. For example, where the data is image data, the fault may be in a pixel of the image data. Statistical models based on a real-world reference image may be capable of for generating for a pixel replacement value. The statistical models may also be based on the outputs of other processors operating on the same input. The statistical models may also be based on of portions of the output, for example, individual pixels in image data, and neighbouring portions, and based on a comparison between the portions determine the quality of the data, such as by extracting quality or plausibility metrics for the data. The statistical models may be generated using one or more machine learning algorithms taking into account the signal processing algorithms used, for example, the kernel size used when training a machine learning algorithm, as well as statistics based on the content of the data, and previously captured data, such as previous image frames. It will be appreciated that similar methods may be used regardless of the type of sensor device and/or data output produced, as such statistical models may also be generated for data received by an infra-red camera, ultrasonic apparatus or any other sensor type suitable for use in a safety critical system.

Once the statistical models have been generated, the method progresses to item 140, where the output of the primary processor is analysed using the statistical models to identify if there is a difference between what would be expected based on the statistical models and the output. If no differences are identified, then it can be assumed that the processing undertaken by the primary processor is as would be expected and that there is no fault. As such the method progresses to item 170 and output of the primary processor is provided to further methods in the safety critical system without adverse effects. Conversely, if one or more differences are identified, then there is a fault in at least one of the outputs, and, the severity of the fault may be determined. The severity of the fault may be based on the characteristics of the fault in the data, for example, whether the fault has occurred in a most or least significant bit of the data, whether there are multiple faults in the data, and the location of the fault in the data. If there is more than a single fault detected, then it is also necessary to ensure that the entirety of the output has not been corrupted.

If it is determined that there is a fault in the output of the primary processor, the method progresses to item 150, where a correction value is generated. The correction value may be based on statistical models and the entirety of the output of the primary processor, or alternatively may be based statistical models and on portions of the output of the primary processor, for example, individual pixels in image data. The statistical models used to generate the correction value may be based on a variety of methods, including but not limited to machine learning algorithms trained on real-world data, and other processing algorithms. The value used to replace the detected fault maybe a corresponding value from the output of another processor. Alternatively, the value used to replace the fault may be interpolated from surrounding values by bilinear interpolation or anisotropic interpolation, for example. As such, by using the statistical model, a best estimate of the faulty portion may be generated, thereby maximising the amount of data that may be used by the system and reducing the need to discard data comprising a minor fault. For example, where the data is image data, and the fault exists in a pixel value of one of the pixels of the image data, the statistical models generated in relation to the faulty portion and the surrounding portions, in the case of image data surrounding pixels, maybe used to generate a corrected pixel value for each of the outputs, and based on each of the corrected values the most plausible value may be chosen. The most plausible value may be based on a real-world image used as a reference against which the actual, faulty pixel is tested, thereby replacing the faulty portion with plausible data matching the expected statistical models.

Once the correction value is generated, the method progresses to item 160, where a most plausible output is generated. The most plausible output is generated by using the correction value to replace the faulty data in the output of the primary processor. In some examples, where plausible data is substantially similar to one of the redundant processor outputs, the data in its entirety may be replaced by the output of that processor. This most plausible output is then outputted to an output device at item 170.

Figure 2:
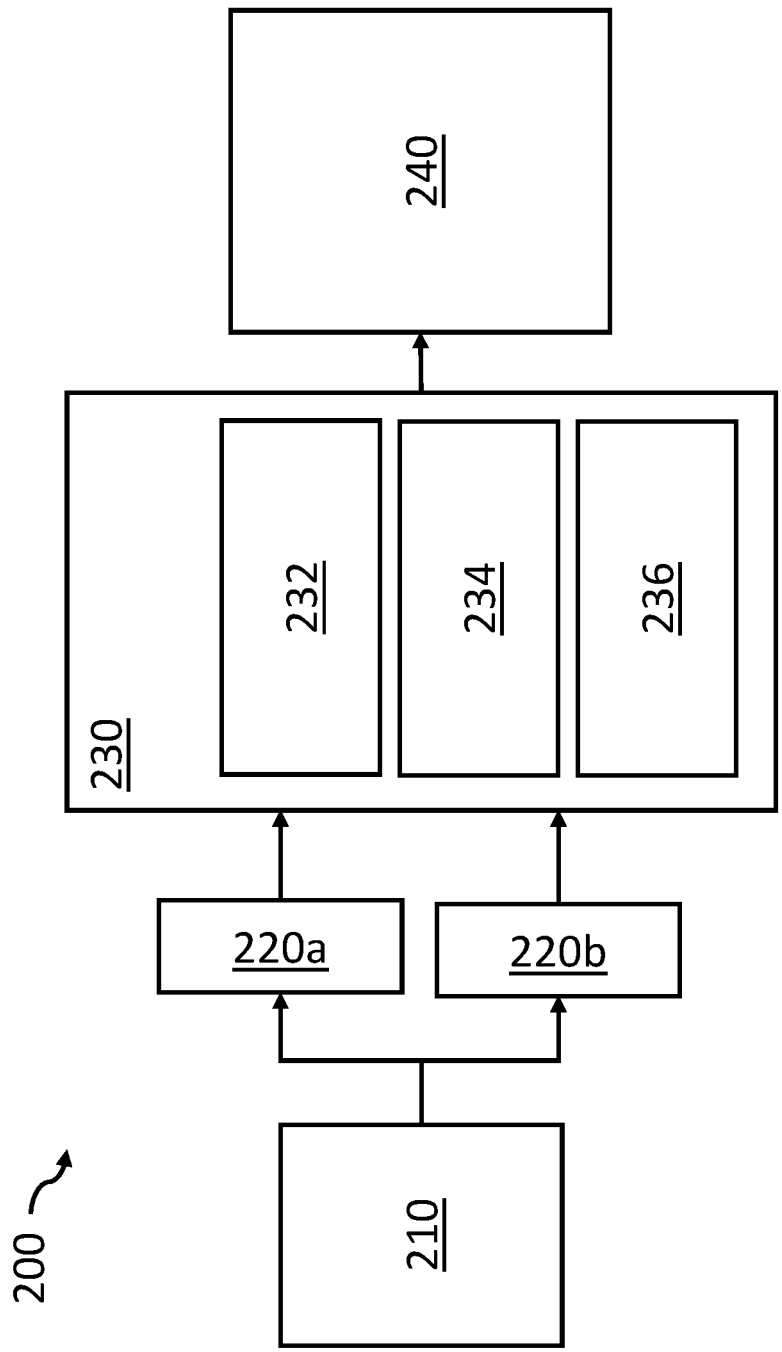
FIG. 2 shows schematically a system according to examples.

FIG. 2 shows schematically a system 200 according to examples. The system 200 comprises one or more sensing devices 210, for receiving data about the environment in which the system exists. For example, the sensing devices 210 may be cameras capable of capturing visible light information about the environment, or alternatively infrared, or other wavelengths of light. The output of the sensing device 210 is processed by at least two processors 220a, 220b, such as image signal processors. One of the processors 220a is the primary processor, whereas the other processors 220b are redundant processors arranged to process the same input in lockstep with the primary processor 220a. As such, each of the processors 220a, 220b undertakes the same processing and applies the same algorithms to the data. It will be appreciated that when the sensing device 210 obtains other information about the environment, for example from ultrasonic sensors, then other types of processor may be used.

The output of the processors 220a, 220b is then passed to a fault detection and correction device 230. The fault detection and correction device 230, may comprise storage, and at least one processor, such as a machine learning processor for analysing and generating an output. The memory may be capable of temporarily storing input data received from one or more sensing devices, as well as the outputs from the primary 220a and redundant processors 220b. The storage may be associated with the same device which houses the camera or other sensing devices, for example, they storage may be associated with an autonomous vehicle. The storage device may be external to the device, such as a remote server, or form part of the input device, such as storage of the camera system itself. The data may be stored within storage of the device, and the storage may be a random-access memory (RAM) such as DDR-SDRAM (double data rate synchronous dynamic random-access memory) or other volatile memory. In other examples, the storage may be or include a non-volatile memory such as Read Only Memory (ROM) or a solid-state drive (SSD) such as Flash memory. The storage in examples may include further storage devices, for example magnetic, optical or tape media, compact disc (CD), digital versatile disc (DVD) or other data storage media. The storage may be removable or non-removable from the device. In some examples, the data stored in the storage device is representative of at least a portion of an image an may be captured by an image sensor external to the device.

At least one component of the fault detection and correction device 230 comprises a statistics modelling module 232 for calculating a variety of statistical models based on the output from the processors 220a, 220b. The statistics modelling module 232 may comprise machine learning algorithms for analysing each of the outputs and producing a variety of statistical models for determining expected values of the data. Such statistical models include, comparing the variance of local pixel values and the expected variance given a particular noise model and the current sensor gain.

Once the statistical models have been calculated, they are used to determine whether there is a fault in the output of the primary processor 220a in the fault determination module 234. The fault determination module 234 compares the data to the statistical models and determines whether the values are what would be expected based on the models. For example, where the data is image data, such as from a camera, the fault determination module 234 checks the pixel values correspond to the expected values based on the statistical models. If the pixel values correspond to the expected values then the primary processor's output may be provided to an output device 240. Alternatively, when the pixel values do not correspond to the expected values provided by the statistical models, a corrected output needs to be generated.

In some examples, when a fault is detected, the output generation module 236 may compare the outputs of each of the processors 220a, 220b to the statistical models to help determine which of the outputs is most suitable for outputting, as the selected output may be a higher quality output. In other examples, the statistical model may be used to generate an expected value for the fault. For example, when the data is image data, the statistical models may be used to generate an expected pixel value if it is determined that the data comprises a faulty pixel. In yet further examples, it will be appreciated that a combination of these methods may be used. This may be appropriate when there are multiple faults in the data, such as multiple faulty pixels.

The output generation module 236 outputs the corrected data to an output device 240. The output device 240 may be an autonomous vehicle's main processor, where the data is used to make decisions about the actions the vehicle should take.

Whilst the example shown in FIG. 2 shows the fault detection and correction module 230 at the end of a processing pipeline, it will be appreciated that the fault detection and correction module 230 may be positioned between operations undertaken by the processors 220a. In such an example, the output of the fault detection and correction module 230 is passed back to the processor for further processing prior to being passed to the output device 240.

Figure 3:
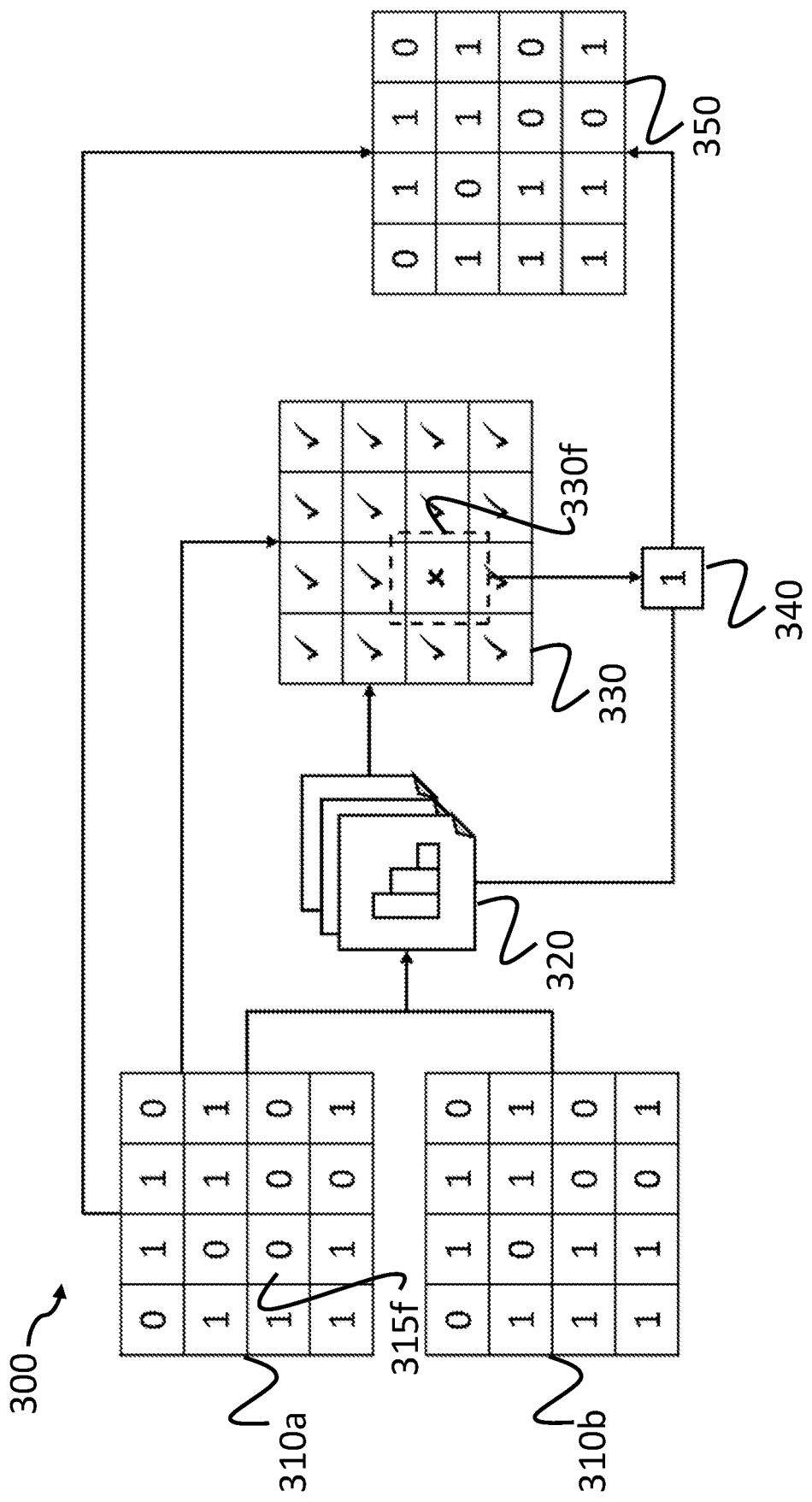
FIG. 3 is a schematic representation of the function of the method of FIG. 1 according to examples.

FIG. 3 is a schematic representation of the function of the method of FIG. 1 according to an example where the data is image data received by a camera. The image data captured by the camera is provided to a plurality of image signal processors for processing to produce a plurality of outputs 310a, 310b. During the processing operations, a transient fault corrupts the output of a flip-flop 315f in the image signal processor, as such a pixel value in the image data is corrupted. When the image data is processed further by the image signal processor, and other signal processing algorithms are applied to the output, such as a noise reduction algorithm, the fault is blurred across neighbouring pixels, and therefore the effect of the fault is reduced but spread.

The output data will then pass to a fault detection and correction module described above in relation to FIG. 2, where statistical models 320 are generated based on the output data 310a, 310b of the primary image signal processor, and other image signal processors arranged to process the image data in lockstep. The output 310b of the redundant image signal processors are unlikely to be affected by the same transient fault that affected the output 310a of the primary image signal processor. The fault detection and correction module is able to determine whether there is a fault and what the severity of the fault is. If the statistical models 320 indicate that there is only a minor fault in the output data, for example where at item 330, the error is in a least significant bit of the pixel value 330f, the fault detection and correction module may still determine that the data is usable by the output device. In some examples, even when it is determined that the fault is not severe, the fault detection and correction module may determine that one of the output 310b of one of the redundant image signal processors is a better quality output, and may instead provide that to the output device. For example, the statistical models may indicate that the output should generally correspond to an output 310b of one of the redundant image signal processors, and therefore, provide that output 310b to the output device.

Conversely, if the transient fault occurs at the end of the processing pipeline, or it was determined that the faulty pixel value is a severe fault, since it is not likely that the fault has been spread amongst surrounding pixels as shown at item 330, the fault detection and correction module may determine that the fault is significantly severe to warrant generating a corrected value 340. If it is determined that a corrected value 340 needs to be calculated, this may be based on an expected value based on the statistical models 320, as well as other data 330 associated with the primary output 310a. The primary output 310a and the corrected value 340 may then be combined to produce a corrected output 350, which is passed to an output device. Alternatively, one of the output 310b of one of the redundant image signal processors may sufficiently match the desired output as suggested by the statistical models, the output data of that redundant processor may be used as the corrected output, and passed to the output device.

It will be appreciated that the replacement, and/or calculation of corrected pixels may occur at any point in the processing pipeline, such as before the noise reduction algorithm mentioned above. This ensures that faults do not accumulate or are spread spatially, as the fault detection and correction module enforces equality between the multiple outputs of the processors at multiple points throughout the processing pipeline.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method for detecting and correcting transient faults, the method the steps of comprising:
   obtaining image data from a camera system;
   processing image data using a first image signal processor and a second image signal processor, to produce first and second output data;
   generating at least one statistical model based on at least the first and second output data;
   identifying whether a fault is present in the first output data based on the statistical models;

generating a correction value for the portion of image data wherein the correction value is an expected value based on the statistical models;

generating updated output data using the correction value; and outputting the updated output data to an output device.

2. The method of claim 1, wherein generating the at least one statistical model is further based on previous image data obtained by the camera system, and at least one real-world reference image.

3. The method of claim 1, wherein the step of processing the image data comprises processing a portion of the image data obtained by the camera system.

4. The method of claim 1, wherein generating the correction value comprises applying at least one machine learning algorithm to the output to generate an expected value for the fault using the at least one statistical model.

5. The method of claim 1, wherein the step of generating updated output data comprises combining the correction value with the first output data.

6. The method of claim 1, wherein the step of generating updated output data comprises comparing a portion of the second output data corresponding to the fault in the first output data, with the correction value, and where the portion substantially corresponds to the correction value, setting the updated output data to be the second output data.

7. A safety critical system comprising:
a camera system for obtaining image data relating to a system environment;
at least two image signal processors each for processing the image data received from the camera system and generating a first output and a second output;
a fault detection and correction module, for detecting one or more faults in the first output, and generating updated output data wherein the updated output data comprises a corrected fault, the corrected fault generated using at least statistical model based on the first output and second output; and
an output device for receiving the updated output data from the fault detection and correction module.

8. The safety critical system of claim 7, wherein the fault detection and correction module comprises:
a statistical model unit for generating at least one statistical model based on the first output and second output;
a fault determination unit for determining whether there is a fault in first output; and
an output generation unit for generating updated output data, the updated output data comprising an expected value generated by the statistical models.

9. The safety critical system of claim 8, wherein the fault detection and correction module further comprises a combination unit for combining the expected value with the first output data.

10. The safety critical system of claim 8, wherein the fault detection and correction module further comprises a comparison unit for comparing the expected value with a portion of the second output corresponding to the fault in the first output data, and if the portion of the second output data is substantially similar to the expected value, outputting the second output data.

11. The safety critical system of claim 7, wherein the output device is a processor, for processing the output of the fault detection and correction module.

12. The safety critical system of claim 7, wherein the fault detection and correction module comprises at least one machine learning processor.

13. A non-transitory computer readable storage medium comprising a set of computer-readable instructions stored thereon which, when executed by at least one processor cause the processor to detect and correct errors in a safety critical system, the instructions comprising:
obtaining image data from a camera system;
processing image data using a first image signal processor and a second image signal processor, to produce first and second output data;
generating at least one statistical model based on at least the first and second output data;
determining whether a fault is present in the first output data based on the statistical models;
generating a correction value for the portion of image data wherein the correction value is an expected value based on the statistical models;
generating updated output data using the correction value; and
outputting the updated output data to an output device.

14. An autonomous vehicle comprising:
at least one camera system; and
a processor arranged to undertake the method of claim 1.

* * * * *